(12) United States Patent
Kanda

(10) Patent No.: US 8,677,908 B2
(45) Date of Patent: Mar. 25, 2014

(54) HYBRID LOCOMOTIVE

(75) Inventor: Masahiko Kanda, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/561,465

(22) Filed: Jul. 30, 2012

(65) Prior Publication Data

US 2013/0199406 A1 Aug. 8, 2013

Related U.S. Application Data

(63) Continuation of application No. PCT/JP2011/001276, filed on Mar. 4, 2011.

(30) Foreign Application Priority Data

Mar. 5, 2010 (JP) ................................. 2010-049555

(51) Int. Cl.
*B61C 3/00* (2006.01)

(52) U.S. Cl.
USPC ................................. 105/35; 105/49; 105/50

(58) Field of Classification Search
USPC ........... 105/34, 35, 36, 37, 38, 49, 50, 51, 52, 105/53, 59, 60
See application file for complete search history.

(56) References Cited

U.S. PATENT DOCUMENTS

| | | | |
|---|---|---|---|
| 5,309,845 A | 5/1994 | Onishi | |
| 6,308,639 B1 | 10/2001 | Donnelly et al. | |
| 7,669,534 B2 * | 3/2010 | Kumar et al. | 105/35 |
| 7,966,945 B1 * | 6/2011 | Miller et al. | 105/49 |
| 7,971,538 B1 * | 7/2011 | Miller et al. | 105/50 |
| 8,006,627 B1 * | 8/2011 | Miller et al. | 105/49 |
| 8,136,454 B2 * | 3/2012 | Barbee et al. | 105/50 |
| 8,171,860 B1 * | 5/2012 | Miller et al. | 105/49 |
| 8,342,103 B2 * | 1/2013 | Barbee et al. | 105/50 |
| 2009/0101041 A1 | 4/2009 | Burns et al. | |
| 2010/0275810 A1 * | 11/2010 | Barbee et al. | 105/50 |
| 2011/0203480 A1 * | 8/2011 | Donnelly | 105/35 |
| 2012/0160124 A1 * | 6/2012 | Barbee et al. | 105/35 |

FOREIGN PATENT DOCUMENTS

| | | |
|---|---|---|
| CH | 261031 | 4/1949 |
| JP | 37-5317 Y1 | 3/1962 |
| JP | 37-11335 Y1 | 5/1962 |
| JP | 55-120560 U | 8/1980 |

(Continued)

OTHER PUBLICATIONS

International Search Report issued Jun. 14, 2011 in PCT/JP2011/001276 (with English translation of Category of Documents).

(Continued)

*Primary Examiner* — Jason C Smith
(74) *Attorney, Agent, or Firm* — Oblon, Spivak, McClelland, Maier & Neustadt, L.L.P.

(57) ABSTRACT

A power conversion unit is unitized by accommodating an inverter, converter, and control equipment etc in a box-shaped enclosure having six faces. A storage battery unit is unitized by accommodating a storage battery and storage battery control equipment etc in a box-shaped enclosure having six faces. The driving control equipment of a driver's cab is accommodated in a box-shaped enclosure having six faces. A power generation unit is unitized by accommodating an engine, main generator and radiator etc in a box-shaped enclosure having six faces. The power conversion unit, storage battery unit, driver's cab and power generation unit are mounted on a car body under-frame.

5 Claims, 5 Drawing Sheets

(56) References Cited

FOREIGN PATENT DOCUMENTS

| | | |
|---|---|---|
| JP | 4-15997 A | 1/1992 |
| JP | 5-664 | 1/1993 |
| JP | 8-275318 A | 10/1996 |
| JP | 9-164947 | 6/1997 |
| JP | 2002-262407 | 9/2002 |
| JP | 2003-531563 | 10/2003 |
| JP | 2005-206139 | 8/2005 |
| JP | 2008-095515 | 4/2008 |
| JP | 2009-67087 | 4/2009 |
| WO | WO 01/81145 A2 | 11/2001 |

OTHER PUBLICATIONS

Japanese Office Action Issued Feb. 8, 2013 in Patent Application No. 2010-049555.

* cited by examiner

HYBRID LOCOMOTIVE

CROSS-REFERENCE TO RELATED APPLICATION

This application claims benefit of priority from Japanese application number JP 2010-49555 filed Mar. 5, 2010, the entire contents of which are incorporated by reference herein.

TECHNICAL FIELD

An embodiment of the present invention relates to a hybrid locomotive in which various equipment is unitized.

TECHNICAL BACKGROUND

In general, whether the locomotive is an electric locomotive or a diesel locomotive, the method of car body construction of a locomotive can be roughly divided into two types. One of these is the method called the "box type car body system" and the other is the method called the "bonnet (or hood) type car body system".

The box type car body system is a monocoque car body system in which a single car body is constituted by a car body under-frame and a steel car body that is welded with the car body under-frame on top of the car body under-frame.

Also, the bonnet type car body system is a system in which a unitary bonnet 20 (for example as shown in Laid-open Japanese Patent Application Tokkai 2008-95515 (hereinafter referred to as Patent Reference 1)) having a door 21, in the form of a unitary cover as shown in FIG. 10, or a divided type bonnet (not shown) obtained by dividing the bonnet 20 into a plurality of divided bonnets is used for the locomotive. The unitary or divided bonnet type car body system is a car body system in which the bonnet 20 is screwed on so as to cover from above the equipment that is arranged in the car body under-frame 3, and in which passages are provided at the outer peripheral side of the bonnet 20 for purposes of for example inspection. As this bonnet type car body system, a "center cab system" or "semi-center cab system" may be adopted, depending on the position of the driver's cab.

Typically, in the case of mainline locomotives, driver's cabs are provided at both the front and rear ends of a vehicle in which a box type car body system is adopted, in order to provide a forward field of view from the driver's cab. On the other hand, in the case of shunting locomotives that are mainly used for shunting, in which the direction of drive is frequently changed during for example a shunting task, the driver's cab is arranged substantially in the middle in the direction of travel of a vehicle in which a bonnet type car body system is adopted.

PRIOR ART REFERENCES

[Patent Reference 1] Laid-open Japanese Patent Application No. 2008-95515

OUTLINE OF THE INVENTION

Problem that the Invention is Intended to Solve

However, in the case of a locomotive in which a bonnet type car body system is adopted as described above, since the tasks of providing wiring or piping to the various items of equipment must be performed after mounting these items in the car body under-frame, a lot of work must be performed such as arrangement and connection of the individual items of equipment on the car body under-frame. Thus, in order to maintain safety of operation and correct sequence of making connections and reliability of the equipment during these many tasks on the car body under-frame, the manufacturing process had to be subjected to restrictions which meant that the order of assembly of the equipment on the car body under-frame could not easily be changed.

Also, since the operating tests to establish whether the various items of equipment were functioning normally could not be performed before these were installed on the car body under-frame but only after the step of performing the piping/wiring operation on the car body under-frame, if some problem was discovered, the task of removing the equipment from the car body under-frame became necessary: this gave rise to the problem of prolonging the manufacturing process.

On the other hand, if a divided type of bonnet was used, since this is easier to manufacture and assemble than a unitary bonnet, there was a risk of penetration of particles such as dust or snow from the gaps between the bonnet units, contaminating the equipment and causing malfunction.

The present invention was achieved in order to solve the above problems, its object being to provide a locomotive in which the operational tasks on the car body under-frame are simplified and wherein the device can be protected from particles such as dust.

Means for Solving the Problem

In order to solve the above problems, a hybrid locomotive according to the present embodiment is constructed as follows. Specifically, in a hybrid locomotive comprising:

a driver's cab in which driving control equipment is accommodated in a rectangular box-shaped enclosure;

a traction converter unit in which power conversion device is accommodated in a rectangular box-shaped enclosure;

a power generation unit in which power generation device and cooling equipment that cools aforementioned power generation equipment is accommodated in a rectangular box-shaped enclosure;

a storage battery unit in which storage battery equipment is accommodated in a rectangular box-shaped enclosure; and a car body under-frame on which aforementioned driver's cab, aforementioned power conversion device, aforementioned power generation unit and aforementioned storage battery unit are mounted;

wherein aforementioned car body under-frame comprises:

a fixing unit on the car body under-frame side whereby aforementioned driver's cab, aforementioned power conversion device, aforementioned power generation unit and aforementioned storage battery unit are connected and fixed; and a fixing unit on the car body side whereby aforementioned driver's cab, aforementioned power conversion device, aforementioned power generation unit and aforementioned storage battery unit are connected with aforementioned car body under-frame and fixed.

With this embodiment, a locomotive can be provided wherein work on the car body under-frame can be simplified and the equipment can be protected from particles such as dust.

MODE FOR PUTTING THE INVENTION INTO PRACTICE

The present embodiment is described below with reference to the drawings.

First Embodiment

Figure 1:
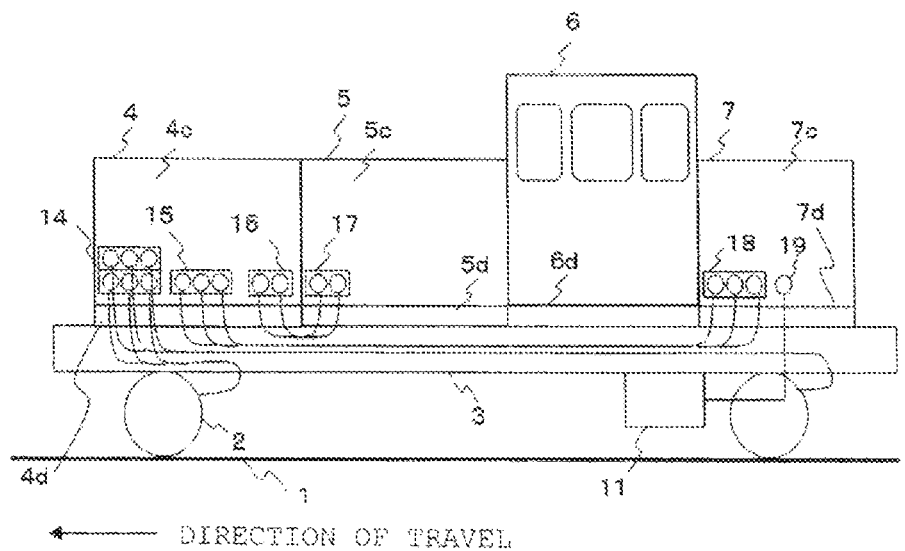
FIG. 1 is a side-face cross-sectional view of a locomotive according to a first embodiment.
Figure 2:
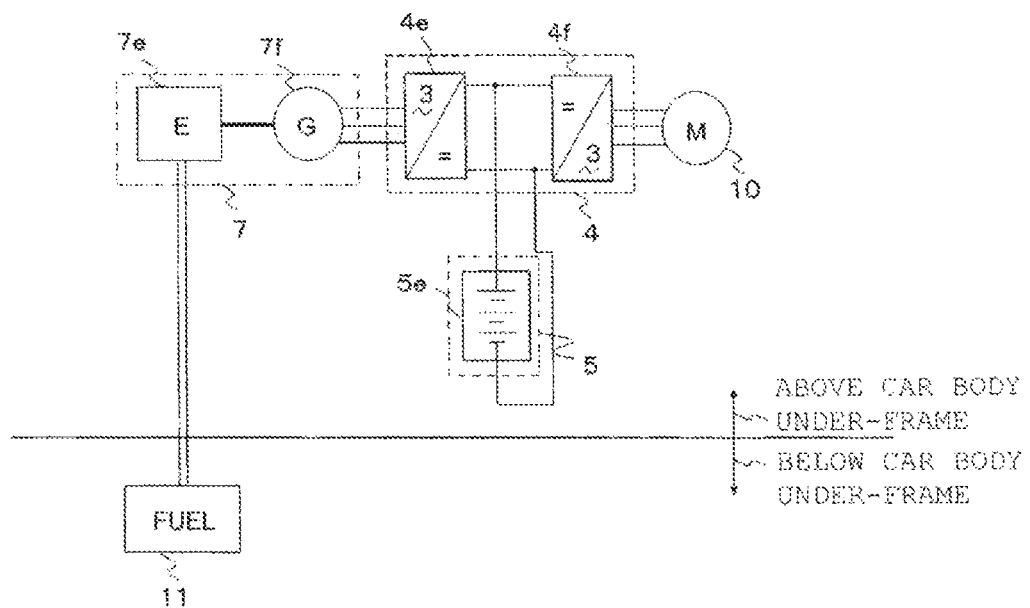
FIG. 2 is a first circuit diagram of a drive system based on the first embodiment.
Figure 3:
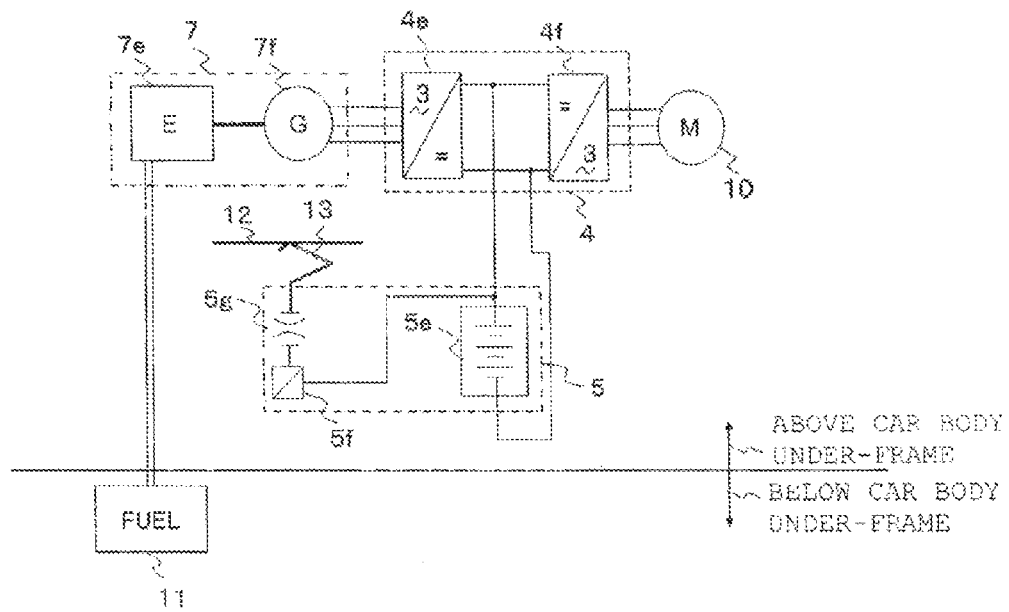
FIG. 3 is a second circuit diagram of a drive system based on the first embodiment.
Figure 4:
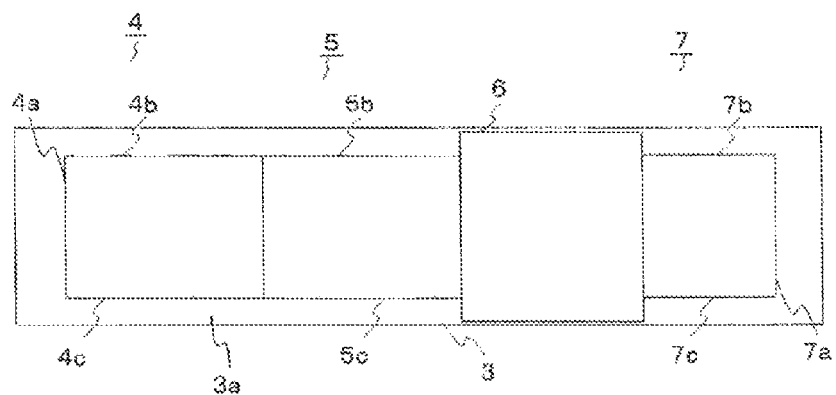
FIG. 4 is a plan view of FIG. 1 of the present embodiment.
Figure 5:
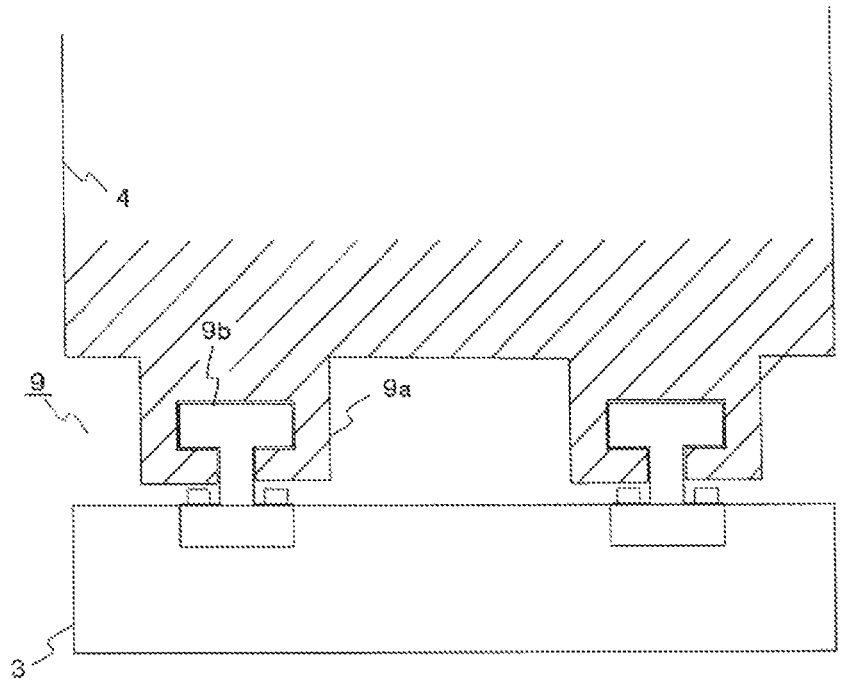
FIG. 5 is a side-face cross-sectional view of a car body under-frame mounting unit according to the first embodiment.

A first embodiment according to the present invention is described in detail with reference to the drawings. FIG. 1 is a side-face cross-sectional view of a locomotive according to a first embodiment of the present invention. FIG. 2 is a first circuit diagram of a drive system based on the first embodiment. FIG. 3 is a second circuit diagram of a drive system based on the first embodiment. FIG. 4 is a plan view of FIG. 1 of the present invention. FIG. 5 is a side-face cross-sectional view of a car body under-frame mounting unit according to the first embodiment of the present invention.

(Construction)

As shown in FIG. 1 and FIG. 4, a first embodiment comprises: rails 1; vehicle wheels 2; a car body under-frame 3; an inspection passage 3a; a fuel tank 11; a traction converter unit frame 4d; a storage battery unit frame 5d; a driver's cab frame 6d; a power generation unit frame 7d; a power conversion unit 4 (having, on the side of an inspection face 4c, a power conversion unit/motor connector 14, a power conversion unit/power generation unit connector 15, and a power conversion unit/storage battery unit connector 16); a storage battery unit 5 (having, on the side of an inspection face 5c, a storage battery unit/power conversion unit connector 17); a driver's cab 6; and a power generation unit 7 (having, on the side of the inspection face 7c, a power generation unit/power conversion unit connector 18 and a fuel tank connector 19).

The power conversion unit 4 is unitized by accommodation of for example an inverter, converter and control equipment in a box-shaped enclosure having six faces. The storage battery unit 5 is unitized by accommodation of for example a storage battery and, if required, storage battery control equipment in a box-shaped enclosure having six faces. In the driver's cab 6, the equipment required for driving the vehicle is accommodated in a box-shaped enclosure having six faces. The power generation unit 7 is unitized by accommodation of for example an engine, main generator and radiator in a box-shaped enclosure having six faces.

As shown in FIG. 1, the vehicle wheels 2 that are in contact with the rails 1 are connected with a car body under-frame 3 having a wide surface. Also, on the surface of the car body under-frame 3 on the opposite side to the rails 1, a frame-shaped power conversion unit frame 4d, a storage battery unit frame 5d, a driver's cab frame 6d and power generation unit frame 7d are mounted by welding; the four sides of these are respectively connected.

Also, as to the shapes of the power conversion unit frame 4d, storage battery unit frame 5d, driver's cab frame 6d and power generation unit frame 7d, a construction may also be adopted in which for example a plurality of channel-shaped structures are linked in the longitudinal direction.

The power conversion unit 4 is installed on the power conversion unit frame 4d and the storage battery unit 5 is installed on the storage battery unit frame 5d, adjacent to the power conversion unit 4. The driver's cab 6 is installed on the driver's cab frame 6d adjacent to the storage battery unit 5. The power generation unit 7 is installed on the power generation unit frame 7d adjacent to the driver's cab 6. Also, a fuel tank 11 is arranged at the face of the car body under-frame 3 on the side of the rails and on the side of the power generation unit 7. As shown in FIG. 4, an inspection passage 3a is provided utilizing the periphery of the car body under-frame 3 so as to communicate with the driver's cab 6, at the periphery of the power conversion unit 4, storage battery unit 5 and power generation unit 7.

(Action)

In a hybrid locomotive according to the present embodiment the storage battery unit 5 can be made of larger size.

The action of a drive system in which the storage capacity of the storage battery unit 6 is improved as described below.

As shown in FIG. 2, an engine 7e of the power generation unit 7 whose driving power (motive force or motive power) is provided by the fuel of the fuel tank 11 is rotated. When this engine 7e is rotated, the rotor of a generator 7f that is directly connected with the shaft of the engine 7e is rotated, so that power generation action takes place. Power is generated by conversion of the mechanical energy into electrical energy by the generating action of the generator 7f. The AC power that is generated by the generator 7f is supplied to a converter 4e of the power conversion unit 4 through a three-phase cable. The AC power that is supplied to the converter 4e is stored in the storage battery 5e of the storage battery unit 5. Stored DC power is supplied to the inverter 4f when the vehicle moves. The DC power that is supplied to the inverter 4f is converted to AC power capable of driving a motor 10 that is installed in the vicinity of the vehicle wheels 2, so that the motor 10 is driven by this converted AC power to move the vehicle. Also, when regenerative action from the motor 10 is feasible using a brake that is mounted on the vehicle, the inverter 4f converts this regenerated current to DC current suitable for charging, and this converted DC power is stored in the storage battery unit 5. When running of the vehicle is commenced, the DC power that is stored in this storage battery unit 5 again flows to the inverter 4f and is used for driving the motor 10.

Also, FIG. 3 is a view showing the case where the storage battery unit 5 is charged by the power of the overhead power line. Overhead power (the power of the overhead power line) is supplied to the storage battery unit 5 through a pantograph 13 from an overhead power line 12. Usually, the overhead power line current passes through a circuit breaker 5g within the storage battery unit 5, and is converted to DC current capable of charging the storage battery 5e by a DC/DC converter 5f, before being stored in the storage battery 5e.

During running of the vehicle, the DC current stored in the storage battery unit 5 is delivered to the inverter 4f to drive the motor 10.

In the event of insufficiency of the storage capacity in the storage battery unit 5, that makes problems in running of the vehicle, the power generation unit 7 generates electricity using the engine 7e and the generator 7f of the power generation unit 7 and stores the current that is thus generated in the storage unit 5, through the converter 4e.

Also, in cases where a regenerative action from the motor 10 is possible by using the brake of the vehicle, the inverter 4f converts the regenerated current to DC current suitable for storage, and this DC current is stored in the storage battery unit 5. The DC power that is stored in this storage battery unit 5 is used when starting running of the vehicle.

For example, by providing a terrestrial installation such as a recharging stand as a terrestrial power source, the pantograph 13 connected with the overhead cable in FIG. 3, the circuit breaker 5g, and DC/DC converter 5f can be replaced by a power receptacle and the vehicle can be adapted to use for example a plug of the recharging stand, so that the power supply can be effected to the hybrid locomotive of the present embodiment from the recharging stand.

It is also possible to use the power generated from the power generation unit 7 as drive power for the motor 10, through the power conversion unit 4. In this way, the battery storage unit 6 is used as the main power source and the power generation unit 7 is used chiefly as a charger.

(Assembling)

The car body under-frame 3 constituting a hybrid locomotive constructed in this way forms a frame serving as a location for the installation of the power conversion unit 4, storage battery unit 5, driver's cab 6 and power generation unit 7; the power conversion unit frame 4d, storage battery unit frame 5d, driver's cab frame 6d and power generation unit frame 7d are of about the same size as the outline of attached face of the mounting of traction converter unit 4, storage battery unit 5, driver's cab 6 and power generation unit 7, and are mounted by for example welding.

After the task of construction of the power conversion unit frame 4d, storage battery unit frame 5d, driver's cab frame 6d and power generation unit frame 7d etc has been completed, the vehicle body under-frame 3 is painted and transferred to the fitting-out facility.

When the vehicle body under-frame 3 has been brought into the fitting-out facility, the piping for the air brakes and the wiring ducts or wiring conduits for connecting the power conversion unit 4, storage battery unit 5, driver's cab 6 and power generation unit 7 are positioned and fixed in the specified positions using for example screws.

After completion of the wiring operation in the wiring ducts or wiring conduits installed on the vehicle body under-frame 3, the operation of connecting up the various wirings is performed.

Also, the power conversion unit 4, storage battery unit 5, driver's cab 6 and power generation unit 7 that had been assembled on the car body under-frame 3 are respectively manufactured or assembled at the optimum construction sites described as bellow.

And once the inverter, converter and control equipment, which are the necessary equipment for performing power conversion, have been connected up and accommodated in operating condition within the frame of the power conversion unit 4, a test of operation of the power conversion unit 4 is then finished or completed at this site where it has been constructed.

And once the storage battery and storage battery control equipment, which are necessary for performing storage of electricity, have been connected within the frame of the storage battery unit 5 and accommodated in an operable condition, a test of operation of the storage battery unit 5 is then conducted at this site where it has been constructed. Once the various items of equipment that are necessary for operation of the vehicle have been connected within the frame of the driver's cab 6 and this equipment has been accommodated in an operable condition, a test of operation of the driver's cab 6 is then conducted at the site where it has been constructed.

Once the engine, main generator, and radiator, that are necessary for performing power generation, have been connected within the frame of the power generation unit 7, and these have been accommodated in an operable condition, a test of operation of the power generation unit 7 is then conducted at the site where it has been constructed.

Thus, after undergoing tests of operation at the sites where they have respectively been constructed, the power conversion unit 4, battery storage unit 5, driver's cab 6 and power generation unit 7, once normal operation has been confirmed, are transferred to the fitting-out facility.

In the conventional process of manufacturing a locomotive, there are many assembly steps of for example wiring on the car body under-frame 3, and the sequence of assembly of the various items of equipment could not easily be changed.

In the present embodiment, any of the power conversion unit 4, battery storage unit 5, driver's cab 6 and power generation unit 7 that have been delivered to the assembling facility can be installed on the car body under-frame 3 after the car body under-frame 3 has been transported to the assembling facility, so the sequence of assembly of the power conversion unit 4, battery storage unit 5, driver's cab 6 and power generation unit 7 can be freely varied.

The power conversion unit 4, battery storage unit 5, driver's cab 6 and power generation unit 7 according to the present embodiment are suspended by for example a crane and transported to above the traction converter unit frame 4d, storage battery unit frame 5d, driver's cab frame 6d and power generation unit frame 7d, lowered onto the respective frame, and installed.

After installation, the traction converter unit frame 4d, storage battery unit frame 5d, driver's cab frame 6d and power generation unit frame 7d on the side of the car body under-frame 3 and fixing frames of the traction converter faces to the car body mounted at the periphery of the power conversion unit 4, battery storage unit 5, driver's cab 6 and power generation unit 7 are fixed or tightened using for example bolts.

Also, the traction converter unit frame 4d, storage battery unit frame 5d, driver's cab frame 6d and power generation unit frame 7d of this embodiment could alternatively be of a shape comprising two rails, rather than of a frame square.

Also, fixing of the traction converter unit frame 4d, storage battery unit frame 5d, driver's cab frame 6d and power generation unit frame 7d, and the power conversion unit 4, battery storage unit 5, driver's cab 6 and power generation unit 7 could be performed from inside of the power conversion unit 4, battery storage unit 5, driver's cab 6 and power generation unit 7.

As described above, after any of the power conversion unit 4, battery storage unit 5, driver's cab 6 and power generation unit 7 has been installed on the car body under-frame 3, the connectors with which it is respectively provided are connected by wiring.

For example, as shown in FIG. 1, the power conversion unit/motor connector 14 that is mounted at the inspection face 4c of the power conversion unit 4 is connected with the motor that is positioned in the vicinity of a vehicle wheel 2.

Also, the power conversion unit/power generation unit connector that is mounted at the inspection face 4c of the power conversion unit 4 is connected with the power generation unit/power conversion unit connector 18 that is mounted at the inspection face of the power generation unit 7.

Also, the power conversion unit/storage battery unit connector 16 that is mounted at the inspection face 4c of the power conversion unit 4 is connected with the storage battery unit/power conversion unit connector 17 that is mounted at the inspection face 5c of the storage battery unit 5. Also, the fuel tank connector 19 that is mounted on the inspection face 7c of the power generation unit 7 is connected with the fuel tank 11.

It should be noted that, as the power conversion unit/motor connector 14, power conversion unit/power generation unit connector 15 or power conversion unit/storage battery unit connector 16, or the storage battery unit/power conversion unit connector 17, power generation unit/power conversion unit connector 18 or fuel tank connector 19 of this embodiment, there is no restriction to connectors and its possible to have connection component capable of effecting connection in a convenient manner.

Also, regarding the car body under-frame 3 and the fixing units 9 of the various items of equipment, an assembly operation could be adopted in which, as shown in FIG. 5, which is a side-face cross-sectional view of the locomotive, a construction is used in which T-shaped projections 9b are mounted on each item of equipment, for example on the side of the power conversion unit 4, and C-shaped recesses 9a are mounted on the side of the car body under-frame 3 so as to surround the projections 9b, the projections 9b being fitted into respective recesses 9a of the frame.

Consequently, the manner of arrangement adopted for the power conversion unit 4, storage battery unit 5, driver's cab 6 and power generation unit 7 can improve the convenience of the fitting-out operation in general and not merely the manner of arrangement of the power conversion unit 4, storage battery unit 5, driver's cab 6 and power generation unit 7 on the power conversion unit frame 4d and the storage battery unit frame 5d, the driver's cab frame 6d and power generation unit frame 7d on the car body under-frame 3.

Also, even in the case of a construction in which recesses 9a are mounted on the side of the car body under-frame 3 and projections 9b are mounted on the side of the car body 8, there is no restriction to these being on the power conversion unit frame 4d, the storage battery unit frame 5d, the driver's cab frame 6d and power generation unit frame 7d on the car body under-frame 3, and the power conversion unit 4, storage battery unit 5, driver's cab 6 and power generation unit 7 could be installed on the car body under-frame 3.

(Beneficial Effect)

In the hybrid locomotive of this embodiment, the storage battery unit 5 is used as the main power source during running of the vehicle and the power generation unit 7 is chiefly used as a charger and/or as an auxiliary power source.

Consequently, the engine in the power generation unit 7 can be reduced in size, making it possible to accommodate all of the equipment necessary for the power generation unit 7, including the radiator, within an enclosure that can be carried on the car body under-frame, and in this manner unitization can be achieved.

With such a hybrid locomotive, the task of installing the power conversion unit 4, storage battery unit 5, driver's cab 6 and power generation unit 7 on the car body under-frame 3 is simplified, and it thus becomes possible to protect the power conversion unit 4, storage battery unit 5, driver's cab 6 and power generation unit 7 respectively from particles such as dust.

Also, since the power generation unit 7 and the various items of equipment within the power conversion unit 4 require periodic maintenance, the power generation unit 7 and the power conversion unit 4 need to have as many inspection faces as possible.

With the arrangement of the present embodiment, it is possible to secure maintenance and inspection faces at three faces of the power conversion unit 4 and power generation unit 7 (the three faces constituted by the inspection faces 4a, 4b and 4c of the power conversion unit 4 and the three faces constituted by the inspection faces 7a, 7b and 7c of the power generation unit 7 shown in FIG. 4).

Also, since the power generation unit 7 has three inspection faces 7a, 7b and 7c, a fully adequate inlet face having inlet ports for the engine and radiator in the power generation unit 7 can be secured.

In this way, by securing a fully adequate inlet face, the speed of the current of cooling air passing through the inlet face can be made low, making it possible to suppress the inconvenience of contamination of the power generation unit 7 due to increase in the amount of particles such as dust entering the power generation unit 7 and to suppress noise generated by high speed air intake.

Also, even in the case where there are a large number of changes in direction of movement, such as in the case of a shunting locomotive, when, as in the present embodiment a power conversion unit 4, storage battery unit 5 and power generation unit 7 which are reduced in size and unitized are mounted on a car body under-frame 3, a fully adequate field of view in the forward/backward and left/right directions can be secured for the performance of the driver's tasks from the driver's cab 6.

Also, by positioning a lightweight driver's cab 6 substantially in the middle of the car body under-frame 3, the weight balance in the longitudinal direction of the vehicle is improved, so load adjustment can be minimized.

Also, by arranging the power conversion unit 4 and the storage battery unit 5 adjacently, the thick main circuit wiring that connects the power conversion unit 4 and the storage battery unit 5 can be prevented from cutting across below the driver's cab 6 arranged where the control wiring and/or air piping is gathered, so the efficiency of assembling is improved.

Also, since the electrical equipment of the power conversion unit 4 and storage battery unit 5 has a certain separation, through the driver's cab 6, from the generation equipment of the power generation unit 7, even if leakage of fuel or lubricating oil takes place from the power generation unit 7 or the piping of the fuel tank and power generation unit 7, effects on the electrical wiring of the electrical equipment can be suppressed. Also, effects on the electrical equipment from the heat of the engine of the power generation unit 7, which is normally at high temperature, can be prevented.

Second Embodiment

Figure 6:
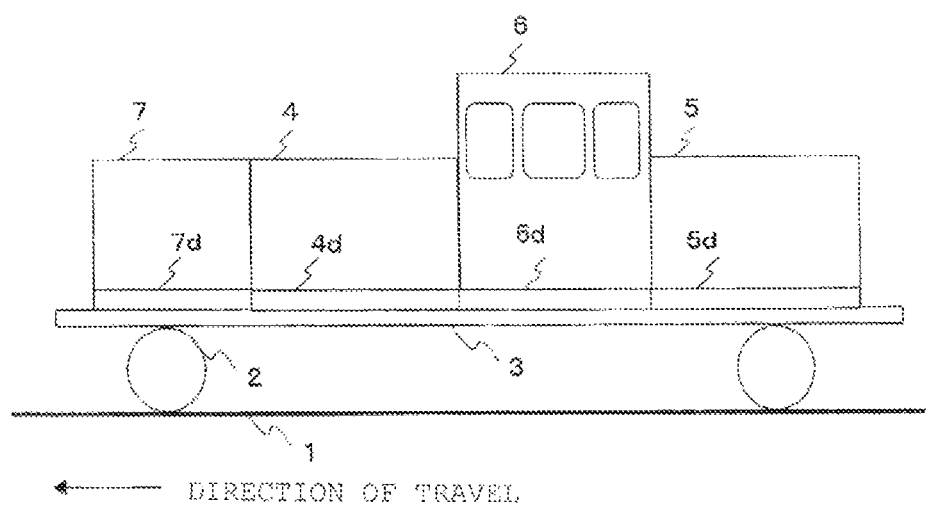
FIG. 6 is a side-face cross-sectional view of a locomotive according to a second embodiment.

A second embodiment of the present invention will now be described in detail with reference to the drawings. FIG. 6 is a side cross-sectional view of a hybrid locomotive according to a second embodiment of the present invention.

Items which are of the same construction in FIG. 1 to FIG. 5 are given the same reference symbols and further description is dispensed with.

In the present embodiment, the arrangement of the power conversion unit 4, storage battery unit 5, driver's cab 6 and power generation unit 7 is different from that of the first embodiment. This aspect is therefore described in detail below.

(Construction)

As shown in FIG. 6, the power generation unit 7 is arranged at the end of the car body under-frame 3; the power conversion unit 4 is arranged adjacent to the power generation unit 7; the driver's cab 6 is arranged adjacent to the power conversion unit 4; and the storage battery unit 5 is arranged adjacent to the driver's cab 6.

(Beneficial Effect)

In the hybrid locomotive of this embodiment, the storage battery unit 5 is used as the main power source during running of the vehicle and the power generation unit 7 serves mainly as a charger, and/or is used as an auxiliary power source. Consequently, the engine in the power generation unit 7 can be reduced in size and it becomes possible to accommodate the entirety of the equipment needed for the power generation unit 7, including the radiator, in an enclosure that can be mounted on the car body under-frame, thereby achieving unitization.

With such a hybrid locomotive, the task of installing the power conversion unit 4, storage battery unit 5, driver's cab 6 and power generation unit 7 on the car body under-frame is simplified and it becomes possible to protect the power conversion unit 4, storage battery unit 5, driver's cab 6 and power generation unit 7 respectively from particles such as dust.

Also, since the driver's cab 6 is substantially in the middle of the car body under-frame 3, the field of view in the forward and rearward directions can be guaranteed, so this is suitable for use for example a shunting locomotive.

Also, since the power generation unit 7 is arranged at the end of the car body under-frame 3, three inspection faces can be secured in the same way as in the case of the first embodiment, making it possible to improve maintenance characteristics.

Furthermore, if for example the fuel tank is arranged below the floor of the car body under-frame 3, the fuel tank and the power generation unit 4 can be connected by fuel piping without passing below the driver's cab 6. Consequently, even if a fire should be caused by occurrence of leakage from the fuel piping, effects on the driver's cab 6 can be suppressed.

Third Embodiment

Figure 7:
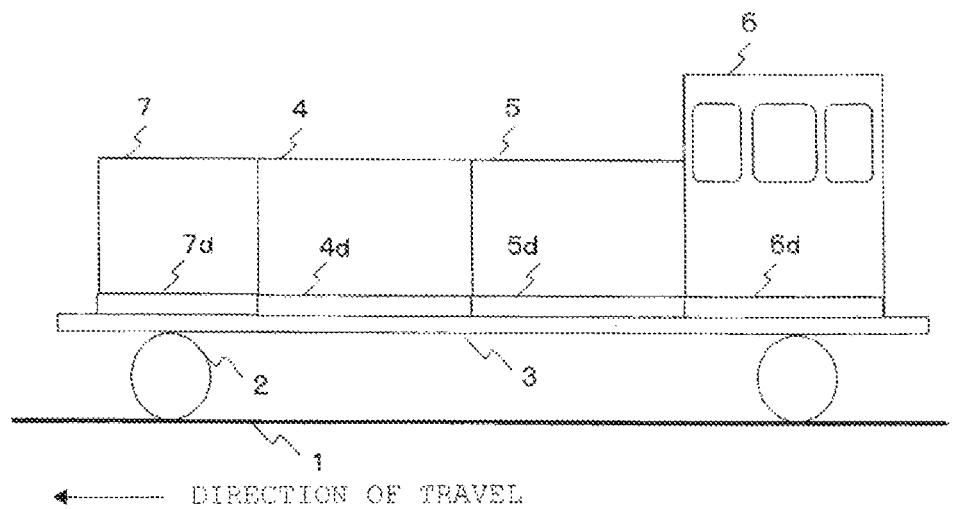
FIG. 7 is a side-face cross-sectional view of a locomotive according to a third embodiment.

A third embodiment of the present invention is described in detail below with reference to the drawings. FIG. 7 is a side cross-sectional view of a hybrid locomotive according to the third embodiment of the present invention. Items which are of the same construction in FIG. 1 to FIG. 5 are given the same reference symbols and further description is dispensed with.

In the present embodiment, the arrangement of the power conversion unit 4, storage battery unit 5, driver's cab 6 and power generation unit 7 is different from that of the first embodiment.

This aspect is therefore described in detail below.

(Construction)

As shown in FIG. 7, the power generation unit 7 is arranged at the end of the car body under-frame 3. The power conversion unit 4 is arranged adjacent to the power generation unit 7. The storage battery unit 5 is arranged adjacent to the power conversion unit 4. The driver's cab 6 is arranged adjacent to the storage battery unit 5.

(Beneficial Effect)

In the hybrid locomotive of this embodiment, the power from the storage battery unit 5 is used as the main power source for vehicle running, and the power generation unit 7 is used chiefly as a charger and/or auxiliary power source.

Consequently, the engine in the power generation unit 7 can be reduced in size, making it possible to accommodate all of the equipment necessary for the power generation unit 7, including the radiator, within an enclosure that can be carried on the car body under-frame, and in this manner unitization can be achieved.

With such a hybrid locomotive, the task of installing the power conversion unit 4, storage battery unit 5, driver's cab 6 and power generation unit 7 on the car body under-frame 3 is simplified, and it thus becomes possible to protect the power conversion unit 4, storage battery unit 5, driver's cab 6 and power generation unit 7 respectively from particles such as dust.

Also, since the power generation unit 7 is arranged at the end of the car body under-frame 3, three inspection faces 4a, 4b and 4c can be secured in the same way as in the case of the first embodiment, so maintenance characteristics can be improved.

Also, since the storage battery unit 5, which is comparatively unlikely to generate noise, is arranged between the driver's cab 6 and the power generation unit 7 and power conversion unit 4, which generate noise or vibration, the effect of noise of vibration on the driver's cab 6 is suppressed.

Furthermore, since the fuel tank is arranged below the floor of the car body under-frame 3, when the power generation unit 7 and this fuel tank are connected by the fuel piping, the fuel piping does not pass through below the driver's cab or the electrical equipment constituted by the power conversion unit 4 or storage battery unit; consequently, even if leakage of fuel should occur from the fuel piping, an electrical wiring fire can be avoided, thereby improving safety.

Also, since the storage battery unit 5 constituting the power source and the power conversion unit 4 that converts the power from the storage battery unit 5 are adjacent to each other, the wiring of the storage battery unit 5 and the power conversion unit 4 can be minimized in length. Since the power conversion unit 4 is arranged substantially in the middle of the car body under-frame 3, the wiring for supplying the power converted by the power conversion unit 4 to the motor that is arranged in the vicinity of the vehicle wheel 2 can be made of minimum length, so the wiring task can be simplified.

In addition, to minimize the length of the wiring the traction converter and the motor also minimize the value of psophometric current (harmonics current) that will be sent out from the wirings between the traction converter and the motor, so that, harmful electrical external interferences from the vehicle are also minimized.

Also, if the positions of installation of the power conversion unit 4 and the storage battery unit 5 in FIG. 7 are interchanged, safety can be improved, since the power conversion unit 4 is arranged between the driver's cab 6 and the storage battery unit 5, where the risk of short-circuiting arises.

Also, since the storage battery unit 5 is arranged between the power generation unit 7 and the power conversion unit 4, when a locomotive such as a diesel locomotive is used in which a large unitized power generation unit 7 is mounted, installation space for this large power generation unit 7 can be secured in a simple fashion by removing the storage battery unit 5.

Fourth Embodiment

Figure 8:
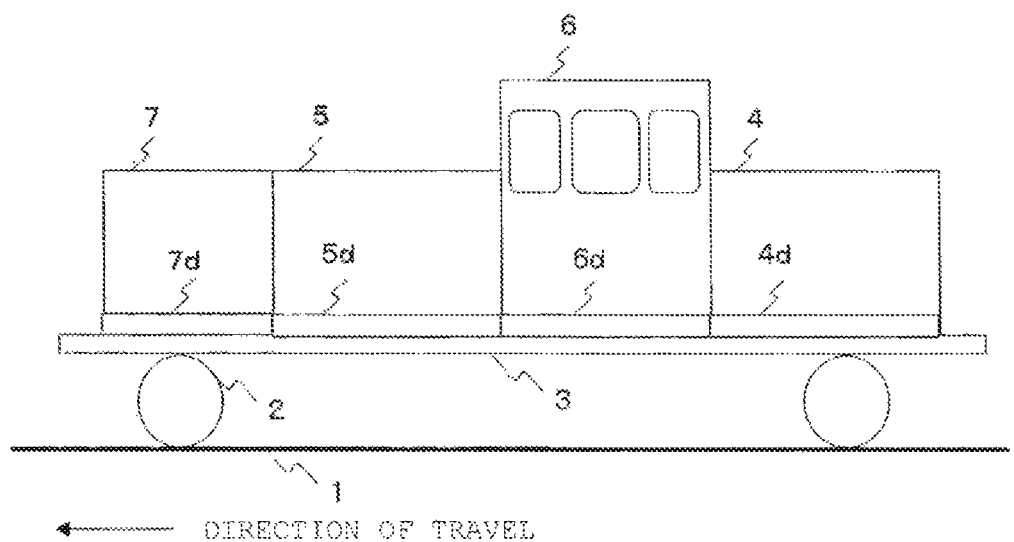
FIG. 8 is a side-face cross-sectional view of a locomotive according to a fourth embodiment.

A fourth embodiment of the present invention is described in detail below with reference to the drawings. FIG. 8 is a side cross-sectional view of a hybrid locomotive according to the fourth embodiment of the present invention.

Items which are of the same construction in FIG. 1 to FIG. 5 are given the same reference symbols and further description is dispensed with.

In the present embodiment, the arrangement of the power conversion unit 4, storage battery unit 5, driver's cab 6 and power generation unit 7 is different from that of the first embodiment. This aspect is therefore described in detail below.

(Construction)

As shown in FIG. 8, the power generation unit 7 is arranged at the end of the car body under-frame 3. The storage battery unit 5 is arranged adjacent to the power generation unit 7. The driver's cab 6 is arranged adjacent to the storage battery unit 5. The power conversion unit 4 is arranged adjacent to the driver's cab 6.

(Beneficial Effect)

In the hybrid locomotive of this embodiment, the power from the storage battery unit 5 is used as the main power source for vehicle running, and the power generation unit 7 is used chiefly as a charger and/or auxiliary power source. Consequently, the engine in the power generation unit 7 can be reduced in size, making it possible to accommodate all of the equipment necessary for the power generation unit 7, including the radiator, within an enclosure that can be carried on the car body under-frame, and in this manner unitization can be achieved.

With such a hybrid locomotive, the task of installing the power conversion unit 4, storage battery unit 5, driver's cab 6 and power generation unit 7 on the car body under-frame 3 is simplified, and it thus becomes possible to protect the power conversion unit 4, storage battery unit 5, driver's cab 6 and power generation unit 7 respectively from particles such as dust.

Also, since the driver's cab 6 is substantially in the middle of the car body under-frame 3, the field of view in the forward and rearward directions can be guaranteed, so this is suitable for a shunting locomotive as an example.

Also, since the power generation unit 4 and the power conversion unit 7 are arranged at the end of the car body under-frame 3, three inspection faces 4a, 4b, and 4c can be secured, making it possible to improve maintenance characteristics.

Also, since the storage battery unit 5 is arranged adjacent to the power generation unit 4, when the power generation unit 4 is scaled up for use in a diesel locomotive, this scaled-up power generation unit 4 can be mounted in the space obtained by removing the storage battery unit 5, so alteration of the application of the locomotive can easily be achieved.

Modified Example

Also, a construction of the power generation unit 7 for implementing the first to fourth embodiments will now be described.

Figure 9:
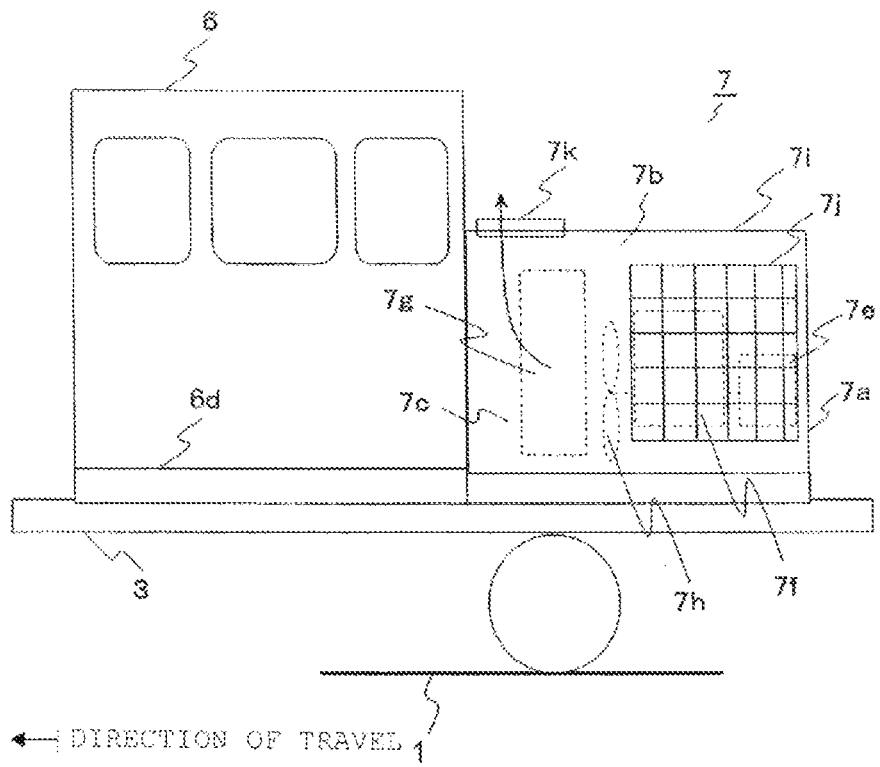
FIG. 9 is a constructional view of a power generation unit of the first embodiment.
Figure 10:
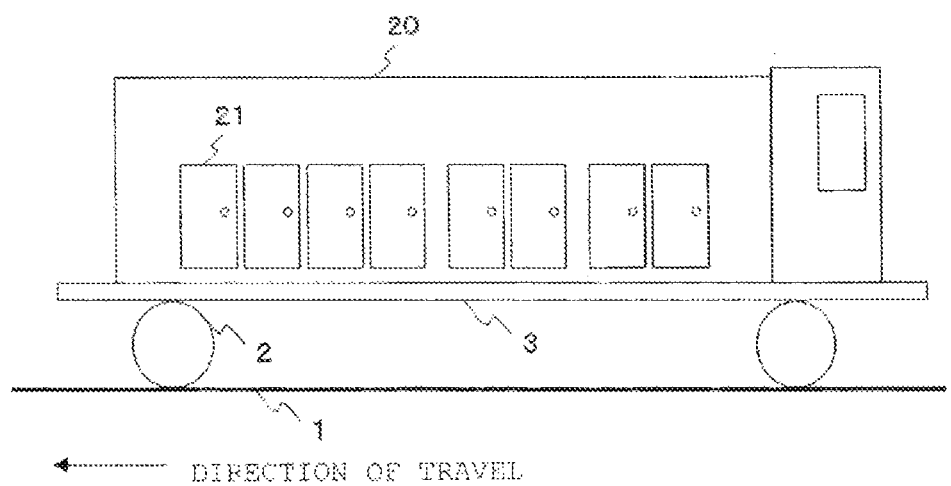
FIG. 10 is an overall view of a locomotive according to a previous invention.

Because of the characteristics of the equipment itself, the power generation unit 7 requires an air inlet port and exhaust port. FIG. 9 is a constructional diagram of a power generation unit.

In FIG. 9, the illustrated power generation unit 7 comprises: a power generation unit enclosure 7i; inspection faces 7a, 7b, 7c of this power generation unit enclosure 7i whereby inspection can be performed from outside; also an air inlet port 7j and exhaust port 7k; an engine 7e arranged within the power generation unit enclosure 7i; a power generator 7f; a fan 7h; and a radiator 7g.

The generator 7f rotates when the engine 7e is driven, using the fuel in the fuel tank for motive power. The fan 7h is rotated with rotation of the generator 7f. When the fan 7h is rotated, external air is drawn in, as a current of cooling air, from the air intake ports 7j provided in the inspection faces 7b and 7c, and the radiator 7g is thus cooled by the current of cooling air by rotation of the fan 7h. When the current of cooling air has cooled the radiator 7g, it is discharged into the atmosphere from the exhaust port 7k that is provided on the ceiling face on the opposite side to the connection face where the power generation unit enclosure 7i is connected with the car body under-frame 3.

With such a power generation unit 7, fully sufficient air inlet faces are secured to keep the air intake speed low, and the exhaust port is provided in the ceiling face, so a fully satisfactory air inlet port 7j and exhaust port 7k can be secured, no matter where their location on the car body under-frame 3.

FIELD OF INDUSTRIAL APPLICATION

The present invention can be applied to a hybrid locomotive that incorporates both a chargeable storage battery and a source of motive power that can be used for both propulsion and charging.

EXPLANATION OF THE REFERENCE SYMBOLS 1 rails
2 vehicle wheels
3 car body under-frame
3a inspection passage
4 power conversion unit
4a inspection face
4b inspection face
4c inspection face
4d power conversion unit frame
4e converter
4f inverter
5 storage battery unit
5a inspection face
5b inspection face
5d storage battery unit frame
5e storage battery
5f converter
5g circuit breaker
6 driver's cab
6d driver's cab frame
7 power generation unit
7a inspection face
7b inspection face
7c inspection face
7d power generation unit frame
7e engine
7f power generator
7g radiator
7h fan
7i power generation unit enclosure
7j air inlet port
7k exhaust port
9 fixing unit
9a hollow
9b protrusion
10 motor
11 fuel tank
12 overhead power line
13 pantograph
14 power conversion unit/motor connector
15 power conversion unit/power generation unit connector
16 power conversion unit/storage battery unit connector
17 storage battery unit/power conversion unit connector
18 power generation unit/power conversion unit connector 19 fuel tank connector
20 bonnet
21 door

The invention claimed is:

1. A hybrid locomotive comprising:
   a driver's cab from which the hybrid locomotive is controlled accommodated in a first enclosure;
   a traction converter unit wherein power conversion device is accommodated in a second enclosure different from the first enclosure;
   a power generation unit wherein power generation device and cooling equipment that cools said power generation device are accommodated in a third enclosure different from the first and second enclosures;
   a storage battery unit wherein a storage battery device is accommodated in a fourth enclosure different from the first, second, and third enclosures; and
   a car body under-frame that carries said driver's cab, said power conversion device, said power generation unit and said storage battery unit;
   wherein said car body under-frame includes:
   a car body under-frame-side fixing unit whereby said driver's cab, said power conversion device, said power generation unit and said storage battery unit are connected and fixed; and
   a car body-side fixing unit whereby said driver's cab, said power conversion device, said power generation unit and said storage battery unit are connected and fixed with said car body under-frame.

2. The hybrid locomotive according to claim 1,
   wherein said car body under-frame-side fixing unit comprises:
   a driver's cab fixing frame whereby said driver's cab is fixed on said car body under-frame;
   a power conversion unit fixing frame whereby said power conversion unit is fixed on said car body under-frame;
   a storage battery unit fixing frame whereby said storage battery unit is fixed on said car body under-frame; and
   a power generation unit fixing frame whereby said power generation unit is fixed on said car body under-frame.

3. The hybrid locomotive according to claim 1,
   wherein said car body under-frame-side fixing unit comprises a hollow portion that is mounted along a longitudinal direction of said car body under-frame; and
   said car body-side fixing unit comprises a protrusion that is mounted on an enclosure of said driver's cab, power conversion unit, storage battery unit and power generation unit.

4. The hybrid locomotive according to claim 1,
   wherein said car body under-frame-side fixing unit comprises a protrusion that is mounted along a longitudinal direction of said car body under-frame; and
   said car body-side fixing unit comprises a hollow that is mounted on an enclosure of said driver's cab, power conversion unit, storage battery unit and power generation unit.

5. A method of manufacturing a hybrid locomotive comprising:
   (1) a unitization manufacturing
      (a) a driver's cab in a first enclosure from which a vehicle as a whole is controlled accommodated in a first enclosure;
      (b) a traction converter unit in which a converter and an inverter that perform power conversion, and control equipment for controlling said converter and said inverter, are accommodated in a second enclosure different from the first enclosure;
      (c) a power generation unit in which an engine and a generator for generating electricity and a radiator for cooling said engine and said generator are accommodated in a third enclosure different from the first and second enclosures; and
      (d) a storage battery unit wherein a plurality of storage batteries are accommodated in a fourth enclosure different from the first, second, and third enclosures; and
   (2) an assembly including
      (e) mounting said driver's cab, said power conversion device, said power generation unit and said storage battery unit that are manufactured by said unitization on a car body under-frame; and
      (f) connecting a fixing unit of said driver's cab, said power conversion device, said power generation unit and said storage battery unit with a fixing unit of said car body under-frame.

* * * * *